US009067216B2

(12) United States Patent
Reinhoudt et al.

(10) Patent No.: US 9,067,216 B2
(45) Date of Patent: Jun. 30, 2015

(54) APPARATUS FOR REMOVAL OF IONS, BI-DIRECTIONAL POWER CONVERTER AND METHOD OF OPERATING AN APPARATUS FOR REMOVAL OF IONS

(75) Inventors: Hank Robert Reinhoudt, Delft (NL); Albert Van Der Wal, Oegstgeest (NL); Timothy John Palmer, Ely (GB); Matthew Charles Bradley Lumb, St. Albans (GB)

(73) Assignee: VOLTEA B.V., Sassenheim (NL)

( * ) Notice: Subject to any disclaimer, the term of this patent is extended or adjusted under 35 U.S.C. 154(b) by 552 days.

(21) Appl. No.: 13/501,703

(22) PCT Filed: Oct. 22, 2010

(86) PCT No.: PCT/NL2010/050704
§ 371 (c)(1),
(2), (4) Date: May 7, 2012

(87) PCT Pub. No.: WO2011/056066
PCT Pub. Date: May 12, 2011

(65) Prior Publication Data
US 2013/0062208 A1   Mar. 14, 2013

(30) Foreign Application Priority Data

Oct. 23, 2009   (EP) .................................... 09173917

(51) Int. Cl.
*B03C 5/02*   (2006.01)
*G01F 1/10*   (2006.01)
(Continued)

(52) U.S. Cl.
CPC ... *B03C 5/02* (2013.01); *G01F 1/10* (2013.01); *B01D 35/06* (2013.01); *B01D 57/02* (2013.01);
(Continued)

(58) Field of Classification Search
CPC ............ B01D 57/02; B01D 35/06; G01F 1/10
USPC ................................ 204/550; 323/271; 326/63
See application file for complete search history.

(56) References Cited

U.S. PATENT DOCUMENTS 6,462,935 B1   10/2002   Shiue ............................ 361/511
6,761,809 B2 *  7/2004   Tran et al. ................... 204/286.1
(Continued)

FOREIGN PATENT DOCUMENTS

CN   101331088   12/2008
JP   11-319838 A  * 11/1999   ................ C02F 1/46
(Continued)

OTHER PUBLICATIONS

JPO computer-generated English language translation of Oda JP H11-319838 A, patent published Nov. 24, 1999.*
(Continued)

*Primary Examiner* — Alexander Noguerola
(74) *Attorney, Agent, or Firm* — Pillsbury Winthrop Shaw Pittman LLP (57) ABSTRACT

An apparatus to remove ions, the apparatus including an inlet to let water in the apparatus; an outlet to let water out of the apparatus; a capacitor; and a spacer to separate a first and a second electrode of the capacitor and to allow water to flow in between the electrodes. The apparatus further including a power converter configured to convert a supply voltage of a power source to a charging voltage to charge the capacitor. The power converter is constructed and arranged to recover energy from the capacitor by converting the voltage on the capacitor to supply voltage of the power source.

20 Claims, 5 Drawing Sheets (51) Int. Cl.
  *B01D 35/06* (2006.01)
  *B01D 57/02* (2006.01)
  *C02F 1/469* (2006.01)
  *H02M 3/158* (2006.01)
  *C02F 1/48* (2006.01)
  *H02J 15/00* (2006.01)
  *C02F 1/461* (2006.01)
  *H02J 7/34* (2006.01)
  *H02M 1/32* (2007.01)

(52) U.S. Cl.
  CPC ..... *C02F 1/4691* (2013.01); *C02F 2001/46133* (2013.01); *C02F 2201/4613* (2013.01); *C02F 2201/46135* (2013.01); *H02J 7/345* (2013.01); *H02M 3/1582* (2013.01); *H02M 2001/322* (2013.01); *C02F 1/48* (2013.01); *H02J 15/00* (2013.01)

(56) References Cited

U.S. PATENT DOCUMENTS

| | | | |
|---|---|---|---|
| 2003/0063430 A1 | 4/2003 | Shiue | 361/522 |
| 2003/0098266 A1 | 5/2003 | Shiue | 210/87 |
| 2005/0012542 A1 | 1/2005 | Kushima et al. | |
| 2008/0105551 A1 | 5/2008 | Wang | 204/627 |

FOREIGN PATENT DOCUMENTS

| | | |
|---|---|---|
| JP | 2002-336865 A | 11/2002 |
| JP | 2005-039936 A | 2/2005 |
| JP | 2007-097252 A | 4/2007 |
| JP | 2008-132466 A | 6/2008 |
| JP | 2009-148737 A | 7/2009 |
| WO | WO 2007/070594 | 6/2007 |

OTHER PUBLICATIONS

JPO machine-generated English language translation of JP 2002-336865 A, downloaded Feb. 9, 2015.*
JPO machine-generated English language translation of JP 2005-039936 A, downloaded Feb. 9, 2015.*
JPO machine-generated English language translation of JP 2007-097252 A, downloaded Feb. 9, 2015.*
JPO machine-generated English language translation of JP 2008-132466 A, downloaded Feb. 9, 2015.*
JPO machine-generated English language translation of JP 2009-148737 A, downloaded Feb. 9, 2015.*
Notification of First Office Action issued for Chinese Patent Application No. 201080047209.3, dated Mar. 31, 2014.
International Search Report and Written Opinion as issued for International Patent Application No. PCT/NL2010/050704, dated Mar. 1, 2011.
Search Report and Written Opinion as issued for European Patent Application No. 09173917.7, dated Apr. 22, 2010.
Japanese Notice of Reason for Rejection issued in Japanese Patent Application No. JP 2012-535151, dated Sep. 11, 2014.

* cited by examiner

APPARATUS FOR REMOVAL OF IONS, BI-DIRECTIONAL POWER CONVERTER AND METHOD OF OPERATING AN APPARATUS FOR REMOVAL OF IONS

FIELD

An apparatus to remove ions, the apparatus including an inlet to let water in the apparatus; an outlet to water out of the apparatus; a capacitor; a spacer to separate a first and a second electrode of the capacitor and to allow water to flow in between the electrodes; and a power converter configured to convert a supply voltage of a power source to a charging voltage to charge the capacitor during an ion removal mode.

BACKGROUND

In recent years one has become increasingly aware of the impact of human activities on the environment and the negative consequences this may have. Ways to reduce, reuse and recycle resources are becoming more important. In particular, clean water is becoming a scarce commodity. Therefore, various methods and devices for purifying water have been published.

A method for water ion removal is by capacitive deionisation, using an apparatus provided with a flow through capacitor (FTC) for removal of ions in water. The FTC functions as an electrically regenerable cell for capacitive deionisation. By charging electrodes, ions are removed from an electrolyte and are held in electric double layers at the electrodes. The electrodes can be (partially) electrically regenerated to desorb such previously removed ions without adding chemicals.

The apparatus to remove ions comprises one or more pairs of spaced apart electrodes (a cathode and an anode) and a spacer, separating the electrodes, allowing water to flow between the electrodes. The electrodes may be made from a high surface area electrically conducting material such as activated carbon, carbon black, a carbon aerogel, carbon nano fiber, carbon nano tubes, graphene or one or more mixtures thereof. The electrodes may be placed as a separate layer on top of a current collector or may alternatively be coated directly onto the current collector. A current collector is made from an electrically conductive material and allows the transport of charge in and out of the electrode.

The apparatus has a housing comprising an inlet to let water in the housing and an outlet to let water out of the housing. In the housing, layers of current collectors, electrodes and spacers are stacked in a "sandwich" fashion or spirally wound by a compressive force, normally by mechanical fastening.

A charge barrier may be placed between the electrode and the spacer, the term charge barrier referring to a layer of material, which can hold an electric charge and which is permeable or semi-permeable for ions. Ions with the same charge signs as that in the charge barrier mostly cannot pass the charge barrier. Therefore, ions which are present in the electrode compartment adjacent to the charge barrier and which have the same charge sign as the charge in the charge barrier, are retained or trapped in the electrode compartment. A charge barrier may allow an increase in ion removal efficiency as well as a reduction in the overall energy consumption for ion removal.

U.S. Patent Application Publication No. US 2008/0105551 A1 discloses an energy recovery converter for recovering of energy from a super capacitor desalination cell.

SUMMARY

It is desirable to provide, for example, an apparatus to remove ions with an improved power converter.

Accordingly, there is provided an apparatus to remove ions, the apparatus comprising:
an inlet to let water in the apparatus;
an outlet to let water out of the apparatus;
a capacitor;
a spacer to separate a first and a second electrode of the capacitor and to allow water to flow in between the electrodes; and
a power converter configured to convert a supply voltage of a power source to a charging voltage to charge the capacitor during an ion removal mode, and the power converter is constructed and arranged to recover energy from the capacitor by converting the voltage on the capacitor to supply voltage of the power source in a first electrode regeneration mode, and the power converter is constructed and arranged to switch the supply voltage between the first and the second electrodes in order to change the polarity of the electrodes with respect to the ion removal mode in a second electrode regeneration mode in which ions remaining on the electrodes are released into the water in between the electrodes by charging the electrodes with a charge at opposite polarity compared to the ion removal mode.

The second electrode regeneration mode may be directly after the first electrode regeneration mode or may be after a number of purification cycles with only a first electrode regeneration mode. The power converter may comprise a first inductor connected in series to the capacitor and via at least a first switch to the power source, and at least a second switch constructed and arranged to short circuit the first inductor and the capacitor, wherein the conversion of the supply voltage to the charging voltage and boost of the voltage on the capacitor to the supply voltage can be controlled by switching the first and second switches.

The apparatus may comprise a controller and the first and second switches are controlled by the controller so as to charge the capacitor during the ion removal mode in which ions in the water flowing in between the electrodes are attracted to the electrodes.

The first and second switches may be controlled by the controller so as to recover energy from the capacitor during a first energy recovery mode in which ions which were previously attracted to the electrodes during the ion removal mode are released into the water in between the electrodes during a first electrode regeneration mode.

The apparatus may comprise a valve connected to the output and controlled by a controller to direct the water during ion removal mode to a clean water output and during the electrode regeneration and first energy recovery mode to a waste water output.

The power converter may comprise a second inductor connected in series with the capacitor and via at least a third switch to the power source, and at least a fourth switch constructed and arranged to short circuit the second inductor and the capacitor, wherein the conversion of the supply voltage to charge the capacitor with a different polarity than in the ion removal mode in a second electrode regeneration mode is controlled by switching the third and fourth switches.

The power converter may be constructed and arranged so as to recover energy from the capacitor during a second energy recovery mode in which the charge at opposite polarity than in the ion removal mode is released and the voltage on the capacitor is boosted to the supply voltage by the power converter.

The power converter may be provided with a fifth switch to bypass the second inductor when the first inductor is used during the ion removal mode and the first electrode regeneration and first energy recovery mode. This may improve the energy efficiency of the electrical circuit by effectively removing the second inductor from the electrical current path of the electrical circuit.

The power converter may be provided with a sixth switch to bypass the first inductor when the second inductor is used during the second electrode regeneration and the second energy recovery mode. This may improve the energy efficiency of the electrical circuit by effectively removing the first inductor from the electrical current path of the electrical circuit.

The valve connected to the output may be controlled by the controller to direct the water during the first energy recovery, regeneration and second regeneration mode to a waste water output.

The power converter may provide a voltage of less than 12 Volts, of less than 6 Volts, of less than 2 Volts or of less than 1.5 Volts between the electrodes.

In an embodiment, there is provided a power converter configured to convert a supply voltage of a power source to a charging voltage to charge a capacitor in an apparatus to remove ions, wherein the power converter is constructed and arranged to recover energy from the capacitor by boosting the voltage on the capacitor to supply voltage of the power source.

In an embodiment, there is provided a method of operating an apparatus to remove ions, the apparatus comprising a capacitor and a housing, the method comprising:

allowing water to enter the housing via an inlet;
allowing the water to flow in between a first and a second electrode of the capacitor to an outlet of the housing; and
during an ion removal mode, charging the capacitor by connecting the capacitor to a power source via a power converter to convert a supply voltage of the power source to a charging voltage and removing ions from the water by attracting the ions to the first and second electrodes; and
during an energy recovery mode, recovering energy in a first regeneration or energy recovery mode from the capacitor by boosting the voltage on the capacitor to supply voltage of the power source while releasing ions from the electrodes in the water during a first electrode regeneration.

The method may comprise a second electrode regeneration mode comprising changing the polarity of the electrodes with respect to the ion removal mode, and charging the electrodes with the changed polarity to release remaining ions on the electrodes into the water in between the electrodes.

The method may comprise a second energy recovery mode, in which the charge at opposite polarity than in the ion removal mode is released and the voltage on the capacitor is boosted to supply voltage by the power converter.

The method may comprise switching a valve connected with the outlet from a clean water output to a waste water output when changing from the ion removal mode to the first and/or second electrode regeneration mode and wherein after ions are removed from the electrodes and the water, containing the released ions, in between the electrodes is flushed away, the valve is switched to connect the output to the clean water output and the ion removal mode will be started again by charging the electrodes.

These and other aspects, features and advantages will become apparent to those of ordinary skill in the art from reading the following detailed description and the appended claims. For the avoidance of doubt, any feature of one aspect of the present invention may be utilised in any other aspect of the invention. It is noted that the examples given in the description below are intended to clarify the invention and are not intended to limit the invention to those examples per se. Similarly, all percentages are weight/weight percentages unless otherwise indicated. Numerical ranges expressed in the format "from x to y" are understood to include x and y. When for a specific feature multiple preferred ranges are described in the format "from x to y", it is understood that all ranges combining the different endpoints are also contemplated.

BRIEF DESCRIPTION OF THE FIGURES

Embodiments of the invention will be described, by way of example only, with reference to the accompanying schematic drawings in which corresponding reference symbols indicate corresponding parts, and in which.

DETAILED DESCRIPTION

Figure 1:
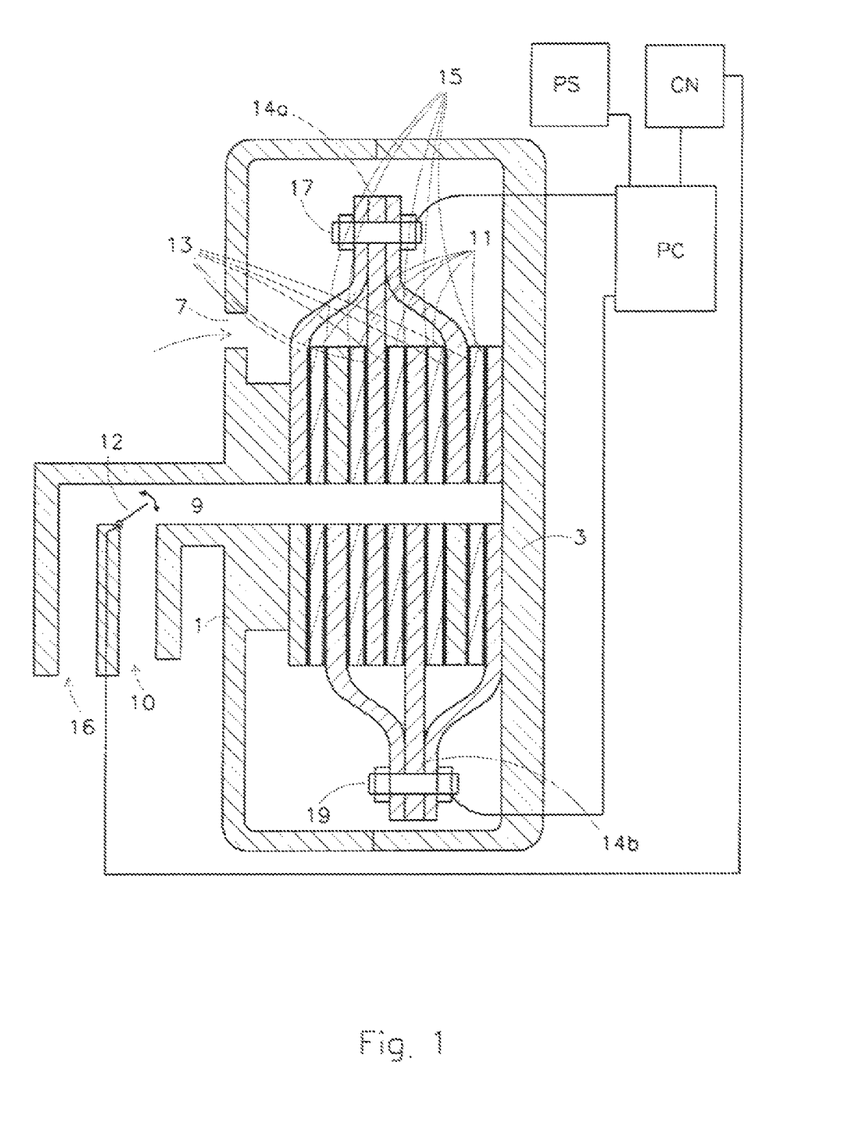
FIG. 1 shows a cross-section of an apparatus for removal of ions.

FIG. 1 shows a schematic cross-section of an apparatus to remove ions according to an embodiment of the invention. The apparatus has a housing comprising a first housing part 1 and a second housing part 3 made of a relatively hard material e.g. a hard plastic. By pressing the first and second housing parts on each other, for example with a bolt and nut (not shown) the housing is made water tight.

The housing has a water inlet 7 and a water outlet 9. During ion removal of the water, the water will flow from the inlet 7 to the outlet 9 through the spacers 11 which separate a first electrode 13 and a second electrode 15 of a flow through capacitor (FTC) from each other. The current collectors 14a and 14b are clamped within the housing and connected to the power converter PC. By creating an electrical potential difference between the first and second electrodes using a power converter PC, for example by applying a positive voltage to the first electrode (the anode) 13 and a negative voltage to the second electrode (cathode) 15, the anions of the water flowing through the spacer 11 are attracted to the first electrode and the cations are attracted to the second electrode. In this way the ions (anions and cations) will be removed from the water flowing through the spacer 11. The purified water may be discharged to the purified water outlet 10 by the valve 12. Once the electrodes are saturated with ions the electrodes may be regenerated, whereby the ions will be released in the water in the spacer 11 in between the electrodes. The water in the spacer compartment with the increased ion content will be flushed away by closing the purified water outlet 10 with a valve 12 under control of the controller CN and opening the waste water outlet 16. Once most ions are released from the electrodes and the water with increased ion content is flushed away via the waste water outlet 16, the electrodes are regenerated and can be used again to attract ions.

A power converter PC under control of the controller CN is used to convert the power from the power source PS to the right electrical potential. The electrical potential difference between the anode and the cathode is rather low, for example lower than 12 Volts, lower than 6 Volts, lower than 2 Volts or desirably less than 1.5 Volts. It is desirable that the electrical resistance of the electrical circuit is low. For this purpose, current collectors 14a which are in direct contact with the first electrodes are connected to each other with the first connector 17 and the current collectors 14b which are in direct contact with the second electrodes are connected to each other with the second connector 19. The current collectors 14a and 14b may be made substantially metal free to keep them corrosion free in the wet interior of the housing and at the same time cheap enough for mass production. The electrodes 13, 15 may be produced from a substantially metal free electrically conductive high surface area material, such as activated carbon, carbon black, carbon aerogel, carbon nano fiber, carbon nano tubes, graphene or one or more mixtures thereof, which is placed on both sides of the current collector. The high surface area layer is a layer with a high surface area in square meters per weight of material, for example more than 500 square meters per gram of material. This set-up may ensure that the capacitor works as an electrical double layer capacitor with sufficient ion storage capacity. The overall surface area of even a thin layer of such a material is many times larger than a traditional material like aluminum or stainless steel, allowing many more charged species such as ions to be stored in the electrode material. The ion removal capacity of the apparatus is thereby increased.

Figure 2:
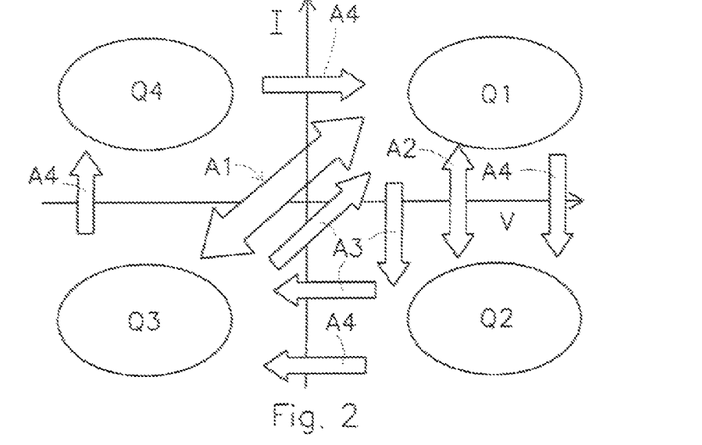
FIG. 2 shows schematically how the apparatus of FIG. 1 can be controlled.

FIG. 2 shows schematically how the apparatus to remove ions can be operated. During ion removal mode Q1 the electrical double layer capacitor is charged at a positive voltage V and with a positive current I. Ions are extracted from the water and once the electrodes of the capacitor become saturated with ions the capacitor may be regenerated by going in one step to the regeneration mode Q3 by reversing the polarity of the electrodes by applying a negative voltage with a negative current. After the ions are released from the electrode, then the capacitor is ready for ion removal in mode Q1 again. Running the flow through capacitor this way is depicted by the arrow A1 and there is no energy recovery.

Alternatively, the capacitor may be regenerated by shunting the electrical circuit, which results in a negative current in the first electrode regeneration mode Q2. The energy that is released during the first electrode regeneration can be recovered and returned to the power source in a first energy recovery mode. This may help to reduce the overall energy consumption of the apparatus. After the first electrode regeneration mode Q2, the capacitor may be used in the ion removal mode Q1 again. Running the flow through capacitor in this way is depicted by the arrow A2.

After the first electrode regeneration mode Q2, the electrodes may be further regenerated in a second electrode regeneration mode Q3 by applying a negative voltage, which results in a negative current and a further release of ions. After the ions are released from the electrode, then the capacitor is ready for ion removal in mode Q1 again. Running the flow through capacitor this way is depicted by the arrow A3.

After the second electrode regeneration mode Q3, the energy stored on the capacitor during the second regeneration mode Q3 may be recovered to the power source in a second energy recovery mode Q4. This full cycle which includes the ion removal mode, the first electrode regeneration mode/the first energy recovery mode, the second electrode regeneration mode and the second energy recovery mode is depicted by the arrows A4. This may help to reduce the overall energy consumption of the apparatus even further. The flow through capacitor may be provided with a valve 12 (in FIG. 1) to discharge the waste water during the first electrode regeneration mode Q2 and the second electrode regeneration mode Q3 into a waste water outlet 16. During ion removal Q1, the valve 12 will be switched such that the water will go to a purified water outlet 10.

Figure 3A:
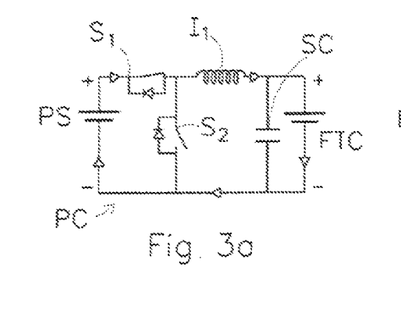
FIGS. 3a-3d show a power converter according to an embodiment of the invention to control the apparatus of FIG. 1.
Figure 3B:
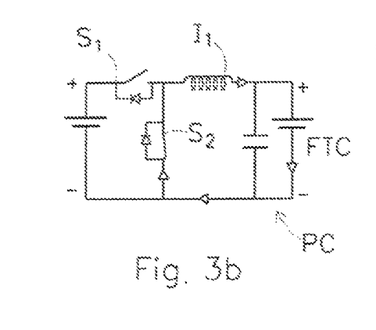

FIGS. 3a-3b show a power converter, according to an embodiment of the invention, to drive a flow through capacitor in the ion removal mode Q1. The power source PS is providing a DC supply voltage e.g. 12 Volts to the power converter PC. The power converter PC comprises first and second switches S1, S2 e.g. field effect transistors and a first inductor I1. The first inductor I1 is connected in series with the flow through capacitor FTC and via at least a first switch to the power source PS. The second switch is constructed and arranged to short circuit the inductor and the capacitor. The conversion of the supply voltage to the charging voltage and vice versa can be controlled by switching the first and second switches. In FIG. 3a the first switch S1 is closed and the second switch S2 is opened and so the supply voltage is therefore divided over the first inductor I1 and the flow through capacitor FTC. Both the flow through capacitor FTC and the inductor I1 store energy and when the first switch S1 is opened and the second switch S2 is closed (see FIG. 3b) the energy stored in the inductor will be used to further charge the flow through capacitor FTC. Smoothening capacitor SC is used parallel to the flow through capacitor FTC to smoothen any high frequency component in the voltage. The smoothening capacitor SC may be present in all embodiments of the present invention on a location parallel to the flow through capacitor FTC although its working will not be discussed in every embodiment.

A controller CN may be used to control the switching of the switches S1, S2 to convert the supply voltage to the charging voltage for the flow through capacitor FTC in the ion removal mode. The charging voltage may be a fixed voltage, for example 1.4 Volts or may be varied in a certain range for example between 1 Volt and 1.5 Volts. The charging voltage may also be varied according to a pre-set mathematical function for example by gradually increasing the voltage or by step wise increasing the voltage, or by applying pulse voltages on top of a fixed voltage.

Figure 3C:
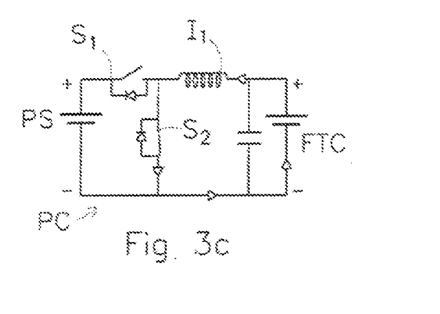
Figure 3D:
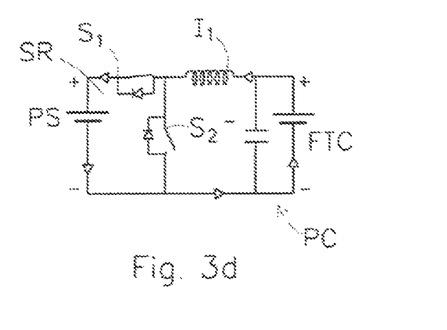

FIGS. 3c-3d show a power converter PC, according to an embodiment of the invention, recovering energy from a flow through capacitor FTC in the first energy recovery mode Q2. In FIG. 3c the flow through capacitor FTC is discharging its energy via the first inductor I1 and the second switch S2. The energy of the flow through capacitor FTC is stored in the first inductor I1. Subsequently, (see FIG. 3d) the second switch S2 is opened and the first switch S1 is closed. The energy stored in the first inductor I1 and energy from the flow through capacitor FTC is now recovered to the power source PS. A controller CN may be used to control the switching of the switches S1, S2 to convert the voltage at which the charge is stored in the capacitor to the supply voltage of the power source PS. The arrows in the Figure depict the direction of the electrical current in the power converter.

Figure 4A:
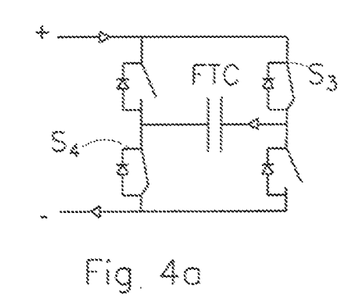
FIGS. 4a-4c show an H-bridge for the power converter of FIG. 3.
Figure 4B:
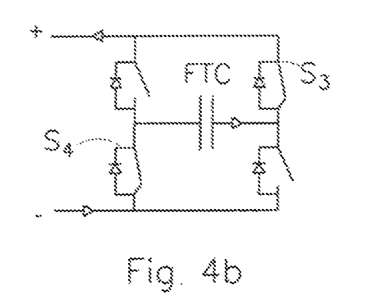
Figure 4C:
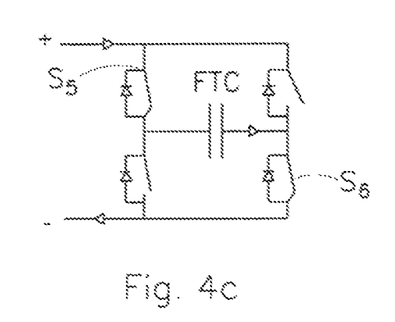

To allow for a second electrode regeneration mode Q3 and second energy recovery mode Q4 the power converter PC may be provided with an H-bridge to apply a voltage at opposite polarity during second electrode regeneration and extract energy from the flow through capacitor FTC during second energy recovery. FIGS. 4a-4c show the H-bridge for the power converter PC. FIG. 4a shows the H-bridge in ion removal mode Q1 when the switches S3 and S4 are closed so as to charge the flow through capacitor FTC. FIG. 4b shows the H-bridge in energy recovery mode Q2 when the switches S3 and S4 are closed so as to recover energy from the flow through capacitor FTC. FIG. 4c shows the H-bridge for the electrode regeneration and energy recovery modes Q3, Q4 when the switches S5 and S6 are closed so as to change the polarity of the electrodes of the capacitor. The switches S3, S4, S5, S6 of the H-bridge may be controlled by the controller CN and may be low speed switches because they do not need to be switched as fast as the switches S1, S2 of the power converter PC. In the event that the power supply PS is not able to accept recovered energy, then as shown in FIG. 4, the switches S3 and S5 or S4 and S6 can be used to shunt the FTC during Q2.

Figure 5:
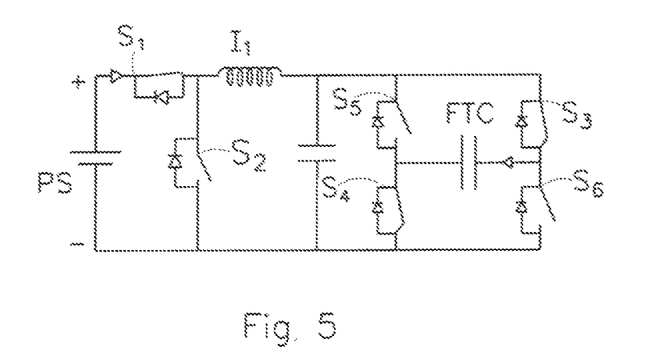
FIG. 5 shows the power converter of FIG. 3 provided with the H-bridge of FIG. 4 according to an embodiment of the invention.

FIG. 5 shows a power converter provided with the H-bridge of FIG. 4 according to an embodiment of the invention. The arrows in the Figure depict the direction of the electrical current. During use of the power converter comprising the H-bridge there will always be three switches in series with the capacitor FTC. The efficiency of the power converter PC is strongly influenced by the resistance of the switches.

Figure 6A:
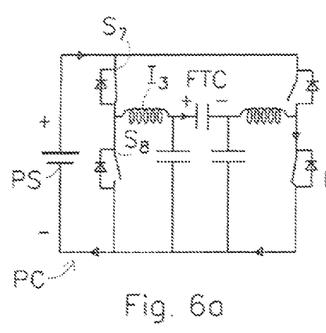
FIGS. 6a-6f show a power converter according to a further embodiment of the invention.
Figure 6B:
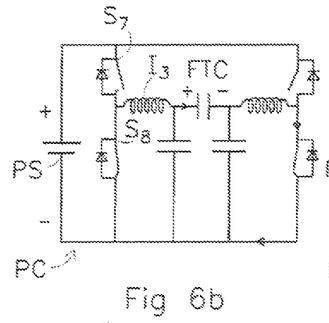

FIGS. 6a-6b show a power converter PC according to a further embodiment of the invention. Again the arrows indicate the direction of the electrical current in the power converter. The power converter PC comprises a first inductor I3 connected in series to the flow through capacitor FTC and via at least a first switch S7 to the power source PS. The power converter PC is provided with a second switch S8 constructed and arranged to short circuit the first inductor I3 and the capacitor FTC wherein the conversion of the supply voltage to the charging voltage can be controlled by switching the first and second switches S7, S8 at high speed from a situation as depicted by FIG. 6a to a situation as depicted by FIG. 6b during ion removal Q1 mode. In FIG. 6a, both the flow through capacitor FTC and the first inductor I3 are storing energy and when the first switch S7 is opened and the second switch S8 is closed (see FIG. 6b) the energy stored in the first inductor I3 will be used to further charge the flow through capacitor FTC. A controller CN may be used to control the switching of the switches S7, S8 to convert the supply voltage to the correct charging voltage for the flow through capacitor FTC in the ion removal mode. The controller may change the switching so as to provide a fixed charging voltage to the flow through capacitor FTC or to provide a voltage which may be varied in a certain range, for example by varying the charging voltage according to a pre-set mathematical function, for example by gradually increasing the voltage or by step wise increasing the voltage, or by applying pulse voltages on top of a fixed voltage.

Figure 6C:
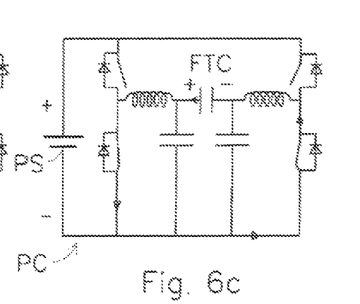
Figure 6D:
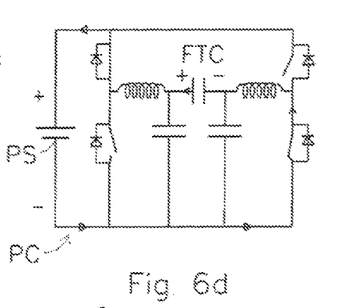

During the first energy recovery Q2 the conversion of the voltage on the capacitor of the FTC to the supply voltage of the power source PS can be controlled by switching the first and second switches S7, S8 at high speed from a situation as depicted by FIG. 6c to a situation as depicted by FIG. 6d.

The power converter PC further comprises a second inductor I4 (see FIG. 6e) connected in series to the flow through capacitor FTC and via at least a third switch S9 to the power source PS. The power converter PC is provided with a fourth switch S10 constructed and arranged to short circuit the second inductor I4 and the flow through capacitor FTC, wherein the conversion of the supply voltage to a regeneration voltage can be controlled by switching the third and fourth switches S9, S10 at high speed from a situation as depicted by FIG. 6e to a situation as depicted by FIG. 6f during electrode regeneration mode Q3.

Figures 6E, 6F:
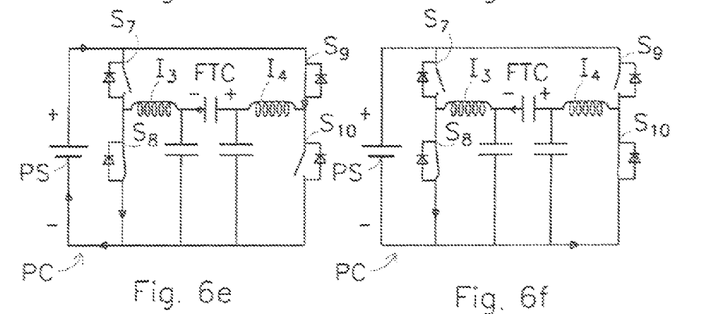

In the second energy recovery mode Q4 the power converter PC can be switched at high speed between a situation in FIG. 6f and FIG. 6e to recover energy stored on the electrodes during the second electrode regeneration mode Q3 to the power supply PS. During the second electrode regeneration mode Q3 and the second energy recovery mode Q4 the power converter PC is respectively delivering electricity to and recovering electricity from the flow through capacitor FTC at different polarity than in the ion removal mode Q1 or first energy recovery mode Q2.

An advantage of the embodiment such as depicted in FIGS. 6a-6f compared to the power converter comprising an H-bridge such as in FIG. 5 is that there are only two switches connected in series at any point in time which in turn leads to a reduction in the overall resistance of the power converter PC. On the other hand, the second inductor I4 is connected in series to the first inductor I3 which leads to a small increase of the overall resistance of the power converter PC.

FIGS. 7a-7f show a power converter PC according to a further embodiment with extra fifth and sixth switches S11, S12 compared to the power converter PC in FIGS. 6a-6f. Again the arrows indicate the direction of the electrical current in the power converter. The fifth switch S11 is used to bypass the first inductor I3 in the second electrode regeneration mode Q3 and the second energy recovery mode Q4. The function of the sixth switch S12 is used to bypass the second inductor I4 in the ion removal mode Q1 and the first energy recovery mode Q2. In this way the losses in energy efficiency owing to the first inductor I3 in modes Q3 and 04, and owing to the second inductor 14 in modes Q1 and Q2 can be eliminated.

Figure 7A:
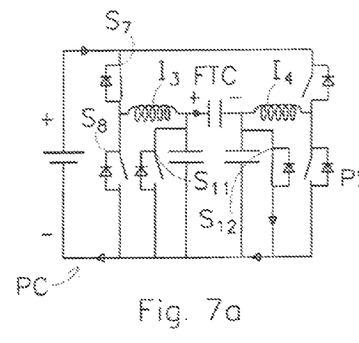
FIGS. 7a-7f show a power converter according to a further embodiment of the invention.
Figure 7B:
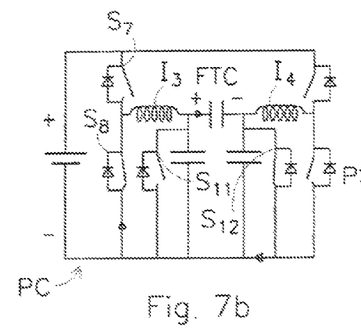

The power converter PC is provided with a second switch S8 constructed and arranged to short circuit the first inductor I3 and the flow through capacitor FTC, wherein the conversion of the supply voltage to the charging voltage can be controlled by switching the first and second switches S7, S8 at high speed from a situation as depicted in FIG. 7a to a situation as depicted by FIG. 7b during ion removal mode Q1. The sixth switch S12 will be closed so as to bypass the second inductor I4 during the ion removal mode Q1. The fifth switch S11 will be open.

Figure 7C:
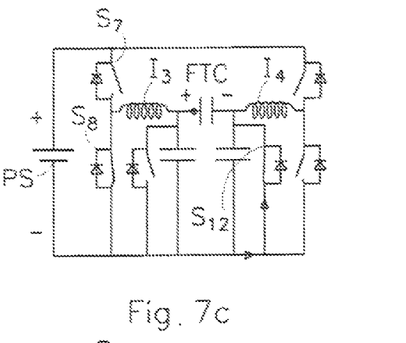
Figure 7D:
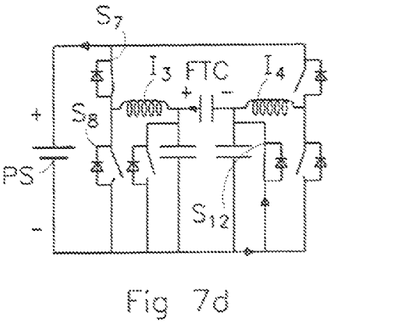

During first energy recovery mode Q2 the conversion of the voltage on the flow through capacitor FTC to the supply voltage of the power source PS can be controlled by switching the first and second switches S7, S8 at high speed from a situation as depicted in FIG. 7c to a situation as depicted in FIG. 7d. The sixth switch S12 will also be closed in order to bypass the second inductor I4 during the first energy recovery mode Q2. The fifth switch S11 will be open.

Figure 7E:
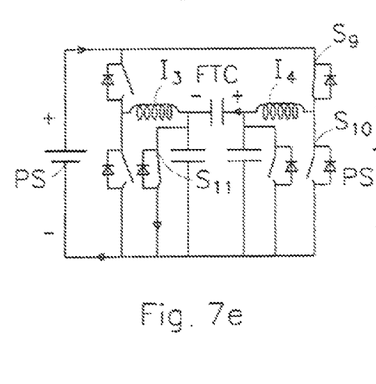
Figure 7F:
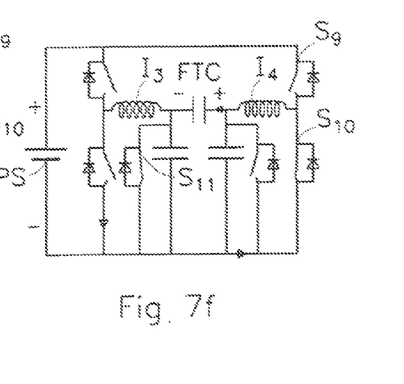

The power converter PC comprises a second inductor I4 (see FIG. 7e) connected in series with the flow through capacitor FTC and via at least a third switch S9 to the power source PS. The power converter PC is provided with a fourth switch S10 constructed and arranged to short circuit the second inductor 14 and the flow through capacitor FTC, wherein the conversion of the supply voltage to a regeneration voltage can be controlled by switching the third and fourth switches S9, S10 at high speed from a situation as depicted in FIG. 7e to a situation as depicted in FIG. 7f during regeneration mode Q3. The fifth switch S11 will be closed in order to bypass the first inductor 13 during electrode regeneration mode Q3. The sixth switch S12 will be open.

In the second energy recovery mode Q4 the power converter PC can be switched at high speed between a situation as depicted in FIG. 7f and FIG. 7e to recover energy from the regeneration mode Q3 to the power supply PS while keeping the fifth switch S11 closed. The fifth switch S11 will be open.

While specific embodiments of the invention have been described above, it will be appreciated that the invention may be practised otherwise than as described.

For example the apparatus may be provided with:
an inlet to let water in the apparatus;
an outlet to let water out of the apparatus;
a capacitor;
a spacer to separate a first and a second electrode of the capacitor and to allow water to flow in between the electrodes; and
a power converter configured to convert a supply voltage of a power source to a charging voltage to charge the capacitor during an ion removal mode, and the power converter is constructed and arranged to de-charge the capacitor in a first electrode regeneration mode, wherein the power converter is constructed and arranged to switch the supply voltage between the first and the second electrode under control of the controller in order to change the polarity of the electrodes with respect to the ion removal mode in a second electrode regeneration mode in which the ions remaining on the electrodes are released into the water in between the electrodes by charging the electrodes with a charge at opposite polarity compared to the ion removal mode.

The ions which were previously attracted to the first and second electrodes during the ion removal mode are released into the water in between the electrodes during the first and second electrode regeneration mode. The apparatus may comprise a valve connected to the output and controlled by a controller to direct the water during the ion removal mode to a clean water output and during the first and second electrode regeneration modes to a waste water output. The power converter may comprise a second inductor connected in series to the capacitor and via at least a third switch to the power source, and at least a fourth switch constructed and arranged to short circuit the second inductor and the capacitor, wherein in the second electrode regeneration mode the conversion of the supply voltage to a charging voltage at different polarity than in the ion removal mode is controlled by the controller by switching the third and fourth switches. The power converter may be constructed and arranged so as to recover energy from the capacitor during a second energy recovery mode in which the charge at opposite polarity than in the ion removal mode is released and the voltage on the capacitor is converted to the supply voltage by the power converter.

The description is intended to be illustrative, not limiting. Thus, it will be apparent to one skilled in the art that modifications may be made to the invention as described without departing from the scope of the claims set out below.

The invention claimed is:

1. An apparatus to remove ions, the apparatus comprising:
an inlet to let water in the apparatus;
an outlet to let water out of the apparatus;
a capacitor;
a spacer to separate a first and a second electrode of the capacitor and to allow water to flow in between the electrodes; and
a power converter configured to convert a supply voltage of a power source to a charging voltage to charge the capacitor during an ion removal mode, and the power converter is constructed and arranged to recover energy from the capacitor by converting the voltage on the capacitor to supply voltage of the power source in a first electrode regeneration mode, and the power converter is constructed and arranged to switch the supply voltage between the first and the second electrodes in order to change the polarity of the electrodes with respect to the ion removal mode in a second electrode regeneration mode in which ions remaining on the electrodes are released into the water in between the electrodes by charging the electrodes with a charge at opposite polarity compared to the ion removal mode.

2. The apparatus according to claim 1, wherein the power converter comprises a first inductor connected in series to the capacitor and via at least a first switch to the power source, and at least a second switch constructed and arranged to short circuit the first inductor and the capacitor, wherein the conversion of the supply voltage to the charging voltage and the conversion of the voltage on the capacitor to supply voltage of the power source can be controlled by switching the first and second switches.

3. The apparatus according to claim 2, wherein the apparatus comprises a controller and the first and second switches are controlled by the controller so as to charge the capacitor during the ion removal mode in which ions in the water flowing in between the first and second electrodes of the capacitor are attracted to the first and second electrodes.

4. The apparatus according to claim 3, wherein the first and second switches can be controlled by the controller so as to convert the voltage on the capacitor to supply voltage of the power source during a first energy recovery mode in which ions which were previously attracted to the first and second electrodes during the ion removal mode are released into the water in between the electrodes.

5. The apparatus according to claim 1, wherein the apparatus comprises a valve connected to the output and controlled by a controller to direct the water during the ion removal mode to a clean water output and during electrode regeneration to a waste water output.

6. The apparatus according to claim 2, wherein the power converter comprises a second inductor connected in series to the capacitor and via at least a third switch to the power source, and at least a fourth switch constructed and arranged to short circuit the second inductor and the capacitor, wherein in the second electrode regeneration mode the conversion of the supply voltage to the charging voltage at different polarity than in the ion removal mode is controlled by switching the third and fourth switches.

7. The apparatus according to claim 6, wherein the power converter is constructed and arranged to recover energy from the capacitor during a second energy recovery mode in which the charge at opposite polarity than in the ion removal mode is released and the voltage on the capacitor is converted to supply voltage of the power source by the power converter.

8. The apparatus according to claim 6, wherein the power converter is provided with a fifth switch to bypass the second inductor when the first inductor is used during the ion removal mode.

9. The apparatus according to claim 7, wherein the power converter is provided with a sixth switch to bypass the first inductor when the second inductor is used during the second electrode regeneration and second energy recovery modes.

10. The apparatus according to claim 1, wherein a valve connected to the output is controlled by a controller to direct the water during the first and second electrode regeneration modes to a waste water output.

11. The apparatus according to claim 1, wherein the power converter is configured to provide a charging voltage of less than 12 Volts, between the electrodes.

12. A power converter configured to convert a supply voltage of a power source to a charging voltage to charge a capacitor in an apparatus to remove ions, the power converter constructed and arranged to recover energy from the capacitor by converting the voltage on the capacitor to supply voltage of the power source, wherein the power converter comprises a first inductor connected in series to the capacitor and via at least a first switch to the power source, and at least a second switch constructed and arranged to short circuit the first inductor and the capacitor, wherein the conversion of the supply voltage to the charging voltage and the conversion of the voltage on the capacitor to supply voltage of the power source can be controlled by switching the first and second switches.

13. A method of operating an apparatus to remove ions, the apparatus comprising a capacitor and a housing, the method comprising:
    allowing water to enter the housing;
    allowing the water to flow in between a first and a second electrode of the capacitor to an outlet of the housing; and
    during an ion removal mode:
    charging the capacitor by connecting the capacitor to a power source via a power converter to convert a supply voltage of the power source to a charging voltage, and
    removing ions from the water by attracting the ions to the first and second electrodes; and
    during a first electrode regeneration mode:
    recovering energy from the capacitor by converting the voltage on the capacitor to supply voltage of the power source while releasing ions from the electrodes into the water in between the electrodes; and
    during a second electrode regeneration mode:
    changing the polarity of the electrodes with respect to the ion removal mode, and
    charging the electrodes at the changed polarity to release remaining ions on the electrodes into the water in between the electrodes.

14. The method according to claim 13, further comprising, after the second electrode regeneration mode:
    recovering energy from the capacitor by converting the voltage on the capacitor to supply voltage of the power source while discharging the capacitor.

15. The method according to claim 14, further comprising switching a valve connected with the outlet from a clean water output to a waste water output when changing from the ion removal mode to a first energy recovery mode and wherein, after ions are removed from the electrodes and the water in between the electrodes is flushed away, the valve is switched to connect the output to the clean water output and the ion removal mode is started again by charging the electrodes.

16. The power converter according to claim 12, comprising a second inductor connected in series to the capacitor and via at least a third switch to the power source, and at least a fourth switch constructed and arranged to short circuit the second inductor and the capacitor, wherein in an electrode regeneration mode conversion of the supply voltage to the charging voltage at a different polarity than in an ion removal mode is controlled by switching the third and fourth switches.

17. The power converter according to claim 16, constructed and arranged to recover energy from the capacitor during an energy recovery mode in which the charge at an opposite polarity than in the ion removal mode is released and the voltage on the capacitor is converted to supply voltage of the power source.

18. The power converter according to claim 16, comprising a fifth switch to bypass the second inductor when the first inductor is used during the ion removal mode.

19. The power converter according to claim 18, comprising a sixth switch to bypass the first inductor when the second inductor is used during the electrode regeneration mode and an energy recovery mode.

20. The method of claim 13, wherein the power converter comprises a first inductor connected in series to the capacitor and via at least a first switch to the power source, and at least a second switch constructed and arranged to short circuit the first inductor and the capacitor, and
    the method further comprising controlling the conversion of the supply voltage to the charging voltage and the conversion of the voltage on the capacitor to supply voltage of the power source by switching the first and second switches.

* * * * *

UNITED STATES PATENT AND TRADEMARK OFFICE
CERTIFICATE OF CORRECTION

| | | |
|---|---|---|
| PATENT NO. | : 9,067,216 B2 | Page 1 of 1 |
| APPLICATION NO. | : 13/501703 | |
| DATED | : June 30, 2015 | |
| INVENTOR(S) | : Hank Robert Reinhoudt et al. | |

It is certified that error appears in the above-identified patent and that said Letters Patent is hereby corrected as shown below:

On title page, item (30) Foreign Application Priority Data
    Correct the European priority application to read as follows:

Oct. 23, 2009   (EP)......................09173917.7

Signed and Sealed this
Tenth Day of November, 2015

Michelle K. Lee
*Director of the United States Patent and Trademark Office*